Patented Apr. 14, 1953

2,635,090

UNITED STATES PATENT OFFICE 2,635,090

METHOD OF PREPARING ACRYLONITRILE POLYMERS

Costas H. Basdekis, Dayton, Ohio, assignor, by mesne assignments, to The Chemstrand Corporation, a corporation of Delaware No Drawing. Application July 23, 1949, Serial No. 106,489

8 Claims. (Cl. 260—85.5)

This invention relates to a new method of preparing uniform polymers of acrylonitrile or copolymers of acrylonitrile and other polymerizable monomers. More specifically the invention relates to new molecular weight regulating compositions by use of which acrylonitrile polymers of uniform chemical and physical properties may be obtained.

It is well known that polyacrylonitrile and copolymers of high proportions of acrylonitrile and minor proportions of other polymerizable monomers are valuable fiber forming compositions. These polymers are difficult to prepare in solution form for fiber spinning, and many of the solutions so prepared cannot be conveniently spun. It is also known that more uniform and more desirable polymers, which can be readily spun, may be prepared if the polymerization is conducted in the presence of a high molecular weight mercaptan. Compositions of this latter type are known as regulators since they prevent the formation of high molecular weight molecules and tend to produce more nearly uniform molecular weights throughout the polymerized mass. The conventional regulators, such as the high molecular weight mercaptans are not generally satisfactory since they introduce color into the polymer and cause the formation of irregular particle sizes and a polymer which is unstable to heat.

The primary purpose of this invention is to provide a light colored acrylonitrile polymer which is readily dissolved in conventional acrylonitrile polymer fiber solvents. A further purpose of this invention is to provide synthetic fibers essentially free of all color and having improved fiber strength. A still further purpose of this invention it to provide an improved polymerization regulator.

It has now been found that many of the objectionable aspects of polyacrylonitrile and copolymers of acrylonitrile can be eliminated by conducting the polymerization in the presence of a new type of regulator. The new regulators are the mercaptomonocarboxylic acids, esters of the mercaptocarboxylic acids, and the water soluble salts of the mercaptocarboxylic acids. Suitable useful regulators are thioglycolic acid, thiolactic acid, ethyl thioglycolate, methyl thiolactate, thiosalicylic acid, β-mercaptopropionic acid, sodium thioglycolate, potassium thiolactate, and the sodium salt of β-mercaptopropionic acid. Other esters, and water soluble salts of carboxylic acids having mercapto substituents may also be used. It has been found that many closely related mercapto derivatives are not effective in producing the new result, for example mercaptoethanol and S-ethyl mercaptoacetic acid.

The new regulated polymerization methods may be conducted with almost any proportion of the mercapto acid or its derivative, from 0.05 to one percent being preferred. It has been found that the optimum regulation effect is achieved by about 0.3 percent by weight of the monomer. Although more or less of the preferred proportion of regulator may be used, generally the properties of the fibers formed are affected disadvantageously if more than one percent is used. Similarly, the use of less than 0.05 percent does not usually eliminate all of the high molecular weight polymer fragments.

The present invention is useful for the preparation of fiber forming polyacrylonitrile resins and the copolymers of at least 80 percent acrylonitrile and up to 20 percent of another nonbasic polymerizable monomer. Suitable comonomers for the practice of this invention are vinyl acetate and other vinyl esters of aliphatic monocarboxylic acids having up to five carbon atoms, vinyl chloroacetate and other vinyl esters of α-chlorocarboxylic acids having up to five carbon atoms, methyl methacrylate and other alkyl esters of methacrylic acid wherein the alkyl radical has up to five carbon atoms, ethyl acrylate and other alkyl esters of acrylic acid wherein the alkyl group has up to five carbon atoms, styrene and other vinyl substituted aromatic hydrocarbons, α-methyl styrene and other isopropenyl substituted aromatic hydrocabons, methacrylonitrile and vinylidine chloride.

The polyacrylonitrile and copolymers of acrylonitrile are prepared by aqueous dispersion polymerization methods. Although any batch or continuous polymerization method is useful in the practice of this invention, preferred methods utilize the semi-batch method, wherein a suitable reactor is charged with a fixed quantity of water and a dispersing agent, and acrylonitrile, or mixture of acrylonitrile and other monomer, is continuously added throughout the course of the polymerization. Thus, the polymerization takes place gradually as the stream of monomers are subjected to polymerization conditions. The reaction is initiated by charging a suitable agitated reactor with the desired quantity of water and a small proportion of a suitable polymerization catalyst. The reaction mass is then heated to approximately the temperature at which boiling will take place in the presence of a small proportion of the unreacted monomer. Upon the introduction of the monomer stream polymerization is initiated and continues at approximately the reflux temperature of the reaction mass. Thus, the reaction proceeds and the reactants are maintained in intimate suspension by the combined action of the agitator and the boiling action.

The polymerization is catalyzed by means of any water soluble peroxy compound, for example, sodium peroxide, hydrogen peroxide, sodium perborate, the sodium salts of other peroxy acids, the potassium, ammonium and other water soluble salts of peroxy acids, and any other water soluble compound containing a peroxy linkage (—O—O—). A wide variation in the quantity of peroxy compound is possible. For example, from 0.1 to 3.0 percent by weight of the polymerizable monomer may be used. The catalyst may be charged at the outset of the reaction, or it may be added continuously or in increments throughout the reaction for the purpose of maintaining a more uniform concentration of catalyst in the reaction mass. The latter method is preferred because it tends to make the resultant polymer more uniform in its chemical and physical properties.

Although the uniform distribution of the reaction throughout the reaction mass can be achieved by vigorous agitation, it is generally desirable to promote the uniform distribution of reagents by using wetting agents, or dispersion stabilizers. Suitable reagents for this purpose are the water soluble salts of fatty acids, such as sodium oleate and potassium stearate, mixtures of water soluble fatty acid salts, such as common soaps prepared by the saponification of animal and vegetable oils, the "amino soaps," such as salts of triethanol amine and dodecyl methyl amine, salts of rosin acids and mixtures thereof, the water soluble salts of half esters of sulfuric acid and long chain alkyl alcohols, sulfonated hydrocarbons, such as alkyl aryl sulfonates, and any other of the wide variety of wetting agents which are in general organic compounds containing both hydrophobic and hydrophilic radicals. The quantity of dispersing agent will depend upon the particular agent selected, the ratio of monomer to be used, and the conditions of polymerization. In general, however, from 0.01 to five percent by weight of the monomers may be employed.

The reagents may be combined by a wide variety of methods. In general the monomers are mixed separately, and the mixture charged to a reaction vessel containing water and all of the other essential ingredients, and maintained at a temperature approximately the same as the ultimate reflux temperature. If desired, the monomers may each be added in a separate stream, but it is more practicable to add a single stream of premixed monomers. Preferably only a small portion of the catalyst is charged at the beginning of the reaction, and the remainder added either continuously or intermittently throughout the course of the reaction. The preferred manner of operation involves heating a body of water containing the amount of dispersing agent to approximately the ultimate reflux temperature of the reaction, and thereafter charging the mixed monomers in the proportions desired in the ultimate copolymer.

These polymerizations are preferably conducted in glass or glass-lined vessels, which are provided with means for agitating the contents thereof. Generally rotary stirring devices are the most effective means of insuring the intimate contact of the reagents, but other methods may successfully be employed; for example by rocking or tumbling the reactors. The polymerization equipment generally used is conventional in the art and the fundamental consideration involved in the selection of the equipment is the type of reaction contemplated. Either apparatus, wherein a portion of the suspension is removed continuously, or the semi-continuous apparatus, where all of the suspension is retained in the reactor until the completion of the reaction, may be used. It is essential in the practice of this invention to charge the monomer gradually throughout the reaction, the rate of charging being determined by the reflux temperature of the reaction mass. Obviously a wide variety of automatic temperature controls may be used to assure the desired conditions. The ideal conditions are achieved by utilizing an automatic valve on the monomer supply which is regulated by a temperature control so as to provide at all times a reaction mass having a constant boiling point. These ideal conditions may be approximated by a mechanism which adds an increment of the monomer every time the temperature reaches a predetermined maximum.

It will be apparent that in the practice of the invention, it is not possible to maintain a constant reflux temperature after all of the prepared charge of mixed monomers has been added. Accordingly, further polymerization may be avoided by interrupting the reaction. This may be done by destroying one or more of the essential conditions of polymerization, for example by reducing the temperature, by adding a polymerization inhibitor, by rapidly steam-distilling the mass to eliminate unreacted monomer, or by interrupting the reaction by filtering the suspended polymer.

The use of regulators improves the utility of the polymer and ultimately the physical properties of the fiber prepared therefrom. The effect of regulator use may readily be determined by measuring the specific viscosity of the polymers, using standard solutions. For convenience in measuring viscosity a 0.1 percent solution of the polymer in N,N-dimethyl-formamide is used. The specific viscosity is directly proportional to the number average molecular weight. The relationship of specific viscosity to molecular weight is described by means of the formula, $$S.V. = K_m CM$$

wherein C is the molar concentration of the polymer, M is the molecular weight and $K_m$ is a constant which must be determined for each system under investigation. In the specific examples hereunder, the effect of regulator use is reflected in the specific viscosity.

Unregulated polymers will have specific viscosities from 0.4 to 0.6, using 0.1 percent concentration in dimethyl-formamide solvent, but by use of the mercapto acids or their derivatives specific viscosities below 0.4 may be obtained. Proper selection and proportioning will yield preferred polymers with specific viscosities between 0.2 and 0.3. Polymers with specific viscosities less than 0.2 will usually not have optimum fiber forming properties.

Further details of the new polymerization method are set forth with respect to the following specific examples.

*Example 1*

A two-liter flask was charged with 750 cc. of distilled water and 0.45 gram of the sodium salt of mahogany acids. The flask was provided with a reflux condenser, a rotary stirring mechanism, and a dropping funnel for the addition of reagents. The dropping funnel was charged with a mixture of 427.5 grams of acrylonitrile, 22.5 grams of vinyl acetate, and 1.08 grams of the ethyl ester of thioglycolic acid. To catalyze the polymerization a solution of 4.5 grams of potassium persulfate in 150 cc. of water was prepared. The polymerization was initiated by heating the aqueous solution to approximately 80° C., and introducing both the monomer mixture and the catalyst solution at rates which permitted the entire addition in two hours. After all of the monomers had been added the reaction mass was maintained at reflux temperature for one-half hour and then steam distilled to evaporate the unreacted monomers. A 98 percent conversion to copolymer was obtained. The polymer suspension was filtered to obtain a white crystalline-like polymer having a specific viscosity of 0.35.

*Example 2*

The procedure of Example 1 was repeated, except that in place of ethyl thioglycolate, thioglycolic acid was used as the regulator. The polymer thereby produced was found to have a specific viscosity of 0.25.

*Example 3*

The procedure of Example 1 was duplicated, except that sodium thioglycolate was used as the regulator. Because the sodium thioglycolate was not soluble in the monomers it was dissolved in the aqueous phase prior to the initiation of the reaction. The specific viscosity of this polymer was found to be 0.33.

*Example 4*

The procedure of Example 1 was repeated, except that S-ethyl thioglycolic acid was used as the regulator. The specific viscosity of the polymer was found to be 0.52, indicating no effective regulation.

*Example 5*

The procedure of Example 1 was repeated, except that no regulator was used. The specific viscosity of the polymer was found to be 0.45.

*Example 6*

Using the procedure identical to that used in Example 1, a polymer was prepared using beta-mercaptopropionic acid as the regulator. The polymer was found to have a specific viscosity of 0.23.

*Example 7*

Using the procedure identical to that described in Example 1, thiosalicylic acid was used as the regulator. The polymer was found to have a specific viscosity of 0.35.

*Example 8*

A polymerization was attempted using mercaptoethanol as the regulator. No regulation effect was observed and the mercaptoethanol strongly inhibited polymerization.

The invention is described by the following claims.

I claim:

1. A method of preparing a filterable colorless copolymer of at least 80 percent acrylonitrile and up to 20 percent of a monomer of the group consisting of vinyl acetate and other vinyl esters of aliphatic monocarboxylic acids having up to five carbon atoms, vinyl chloroacetate and other vinyl esters of alpha-chlorocarboxylic acids having up to five carbon atoms, methyl methacrylate and other alkyl esters of methacrylic acid wherein the alkyl radical has up to five carbon atoms, ethyl acrylate and other alkyl esters of acrylic acid wherein the alkyl group has up to five carbon atoms, styrene and other vinyl substituted aromatic hydrocarbons, alpha-methyl styrene and other isopropenyl substituted aromatic hydrocarbons, methacrylonitrile and vinylidene chloride, which comprises heating the monomers at the reflux temperature in an aqueous medium in the presence of a water-soluble peroxy compound, a dispersing agent and a compound of the group consisting of mercaptocarboxylic acids, esters of mercaptocarboxylic acids, and the water-soluble salts of the mercaptocarboxylic acids, for a time sufficient to produce a copolymer having a specific viscosity in the range of 0.2 to 0.3, said derivatives of the monocarboxylic acids, alpha-chlorocarboxylic acids, and mercaptocarboxylic acids being hydrocarbons except with respect to the designated substituents.

2. A method of preparing a filterable colorless copolymer of at least 80 percent acrylonitrile and up to 20 percent of a monomer of the group consisting of vinyl acetate and other vinyl esters of aliphatic monocarboxylic acids having up to five carbon atoms, vinyl chloroacetate and other vinyl esters of alpha-chlorocarboxylic acids having up to five carbon atoms, methyl methacrylate and other alkyl esters of methacrylic acid wherein the alkyl radical has up to five carbon atoms, ethyl acrylate and other alkyl esters of acrylic acid wherein the alkyl group has up to five carbon atoms, styrene and other vinyl substituted aromatic hydrocarbons, alpha-methyl styrene and other isopropenyl substituted aromatic hydrocarbons, methacrylonitrile and vinylidene chloride, which comprises heating the monomers at the reflux temperature in an aqueous medium in the presence of a water-soluble peroxy compound, a dispersing agent and thioglycolic acid, for a time sufficient to produce a copolymer having a specific viscosity in the range of 0.2 to 0.3, said derivatives of monocarboxylic acids and alpha-chlorocarboxylic acids being hydrocarbons except for the designated substituents.

3. A method of preparing a filterable colorless copolymer of at least 80 percent acrylonitrile and up to 20 percent of a monomer of the group consisting of vinyl acetate and other vinyl esters of aliphatic monocarboxylic acids having up to five carbon atoms, vinyl chloroacetate and other vinyl esters of alpha-chlorocarboxylic acids having up to five carbon atoms, methyl methacrylate and other alkyl esters of methacrylic acid wherein the alkyl radical has up to five carbon atoms, ethyl acrylate and other alkyl esters of acrylic acid wherein the alkyl group has up to five carbon atoms, styrene and other vinyl substituted aromatic hydrocarbons, alpha-methyl styrene and other isopropenyl substituted aromatic hydrocarbons, methacrylonitrile and vinylidene chloride, which comprises heating the monomers at the reflux temperature in an aqueous medium in the presence of a water-soluble peroxy compound, a dispersing agent and the ethyl ester of thioglycolic acid, for a time sufficient to produce a copolymer having a specific viscosity in the range of 0.2 to 0.3, said derivatives of monocarboxylic acids and alpha-chlorocarboxylic acids being hydrocarbons except for the designated substituents.

4. A method of preparing a filterable colorless copolymer of at least 80 percent acrylonitrile and up to 20 percent of a monomer of the group consisting of vinyl acetate and other vinyl esters of aliphatic monocarboxylic acids having up to five carbon atoms, vinyl chloroacetate and other vinyl esters of alpha-chlorocarboxylic acids having up to five carbon atoms, methyl methacrylate and other alkyl esters of methacrylic acid wherein the alkyl radical has up to five carbon atoms, ethyl acrylate and other alkyl esters of acrylic acid wherein the alkyl group has up to five carbon atoms, styrene and other vinyl substituted aromatic hydrocarbons, alpha-methyl styrene and other isopropenyl substituted aromatic hydrocarbons, methacrylonitrile and vinylidene chloride, which comprises heating the monomers at the reflux temperature in an aqueous medium in the presence of a water-soluble peroxy compound, a dispersing agent, and beta-mercaptopropionic acid, for a time sufficient to produce a copolymer having a specific viscosity in the range of 0.2 to 0.3, said derivatives of monocarboxylic acids and alpha-chlorocarboxylic acids being hydrocarbons except for the designated substituents.

5. A method of preparing a filterable colorless copolymer of at least 80 percent acrylonitrile and up to 20 percent of vinyl acetate, which comprises heating the monomers at the reflux temperature in an aqueous medium in the presence of a water-soluble peroxy compound, a dispersing agent and from 0.05 to one percent of a compound of the group consisting of mercaptocarboxylic acids, esters of mercaptocarboxylic acids, and the water-soluble salts of the mercaptocarboxylic acids, for a time sufficient to produce a copolymer having a specific viscosity in the range of 0.2 to 0.3, said derivatives of the mercaptocarboxylic acids being hydrocarbons except for the designated substituents.

6. A method of preparing a filterable colorless copolymer of at least 80 percent acrylonitrile and up to 20 percent of vinyl acetate, which comprises heating the monomers at the reflux temperature in an aqueous medium in the presence of a water-soluble peroxy compound, a dispersing agent and from 0.05 to one percent of thioglycolic acid, for a time sufficient to produce a copolymer having a specific viscosity in the range of 0.2 to 0.3.

7. A method of preparing a filterable colorless copolymer of at least 80 percent acrylonitrile and up to 20 percent of vinyl acetate, which comprises heating the monomers at the reflux temperature in an aqueous medium in the presence of a water-soluble peroxy compound, a dispersing agent and from 0.05 to one percent of the ethyl ester of thioglycolic acid, for a time sufficient to produce a copolymer having a specific viscosity in the range of 0.2 to 0.3.

8. A method of preparing a filterable colorless copolymer of at least 80 percent acrylontrile and up to 20 percent of vinyl acetate, which comprises heating the monomers at the reflux temperature in an aqueous medium in the presence of a water-soluble peroxy compound, a dispersing agent and from 0.05 to one percent of beta-mercaptopropionic acid, for a time sufficient to produce a copopolymer having a specific viscosity in the range of 0.2 to 0.3.

COSTAS H. BASDEKIS.

References Cited in the file of this patent

UNITED STATES PATENTS

| Number | Name | Date |
|---|---|---|
| 2,434,054 | Roedel | Jan. 6, 1948 |
| 2,537,031 | Chaney | Jan. 9, 1951 |

FOREIGN PATENTS

| Number | Country | Date |
|---|---|---|
| 573,270 | Great Britain | Nov. 14, 1945 |

OTHER REFERENCES

Bacon Trans. Faraday Society, vol. 42, pp. 140–155 (1946).